(12) United States Patent
Weller (10) Patent No.: US 10,970,848 B2
(45) Date of Patent: Apr. 6, 2021

(54) FONT FAMILY AND SIZE AWARE CHARACTER SEGMENTATION

(71) Applicant: SAP SE, Walldorf (DE)

(72) Inventor: Tobias Weller, Buseck (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 16/204,888

(22) Filed: Nov. 29, 2018

(65) Prior Publication Data

US 2020/0175690 A1 Jun. 4, 2020

(51) Int. Cl.
| | | |
|---|---|---|
| *G06T 7/136* | (2017.01) | |
| *G06K 9/00* | (2006.01) | |
| *G06K 9/62* | (2006.01) | |
| *G06T 7/50* | (2017.01) | |
| *G06T 7/60* | (2017.01) | |
| *G06T 7/12* | (2017.01) | |
| *G06K 9/38* | (2006.01) | |

(52) U.S. Cl.
CPC .......... *G06T 7/136* (2017.01); *G06K 9/00442* (2013.01); *G06K 9/622* (2013.01); *G06K 9/628* (2013.01); *G06T 7/12* (2017.01); *G06T 7/50* (2017.01); *G06T 7/60* (2013.01); *G06K 9/38* (2013.01); *G06K 2209/01* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 8,229,883 B2 | 7/2012 | Brauer et al. | |
| 8,571,270 B2 | 10/2013 | Nijemcevic | |
| 9,367,736 B1 | 6/2016 | Senechal et al. | |
| 9,430,703 B2 | 8/2016 | Ming | |
| 9,715,556 B2 | 7/2017 | Sekharan | |
| 2005/0114269 A1* | 5/2005 | Pintsov | G06Q 20/3674 705/62 |
| 2014/0111416 A1* | 4/2014 | Sugiura | G06F 3/03 345/156 |
| 2015/0302242 A1* | 10/2015 | Lee | G06K 9/00442 382/189 |
| 2018/0184012 A1* | 6/2018 | Kanatsu | G06K 9/20 |

FOREIGN PATENT DOCUMENTS

CN 104050471 2/2017

* cited by examiner

*Primary Examiner* — Kevin Ky
(74) *Attorney, Agent, or Firm* — Fountainhead Law Group P.C.

(57) ABSTRACT

A method clusters each character on a document into one of a plurality of clusters based on widths of at least a portion of the characters on the document and measures distances between characters on the document. A threshold for each of the plurality of clusters is calculated based on at least a portion of the distances between characters in each cluster. The method then segments characters into units using the thresholds for the plurality of clusters. A distance between two characters in the document is compared to a threshold for a cluster to classify the two characters as being part of a unit when the distance is less than the threshold and not being part of the unit when the distance is greater than the threshold. Then, the method performs a recognition process on the document using the units.

20 Claims, 9 Drawing Sheets

FONT FAMILY AND SIZE AWARE CHARACTER SEGMENTATION

BACKGROUND

When automatically processing documents, or images with text, an optical character recognition (OCR) software application segments the document into meaningful units, such as words. Every error that is introduced in this initial step may significantly lower the overall accuracy of the recognition process. For example, the OCR software application may output poor recognition results when poor word segmentation occurs even though the character recognition part was performed acceptably. This is because incorrect word segmentation cannot be overcome even by excellent recognition of the characters. For example, the original text of the document contains two amounts of "12,123 45,67", but the word segmentation merges the two amounts into one word of "12,123456,67", and it is impossible to know if and where the string should be split. For example, some interpretations could be "12,12 345,67" or "12,1 23456,67", etc. Accordingly, a poor word segmentation may negatively affect the optical character recognition results.

DETAILED DESCRIPTION

Described herein are techniques for a character segmentation system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments receive a document for character recognition. Before performing the character recognition, a system analyzes the characters to determine information that is used to segment the document into units, such as words. For example, the system analyzes the distance between characters and generates thresholds that can be used to determine whether or not to segment consecutive characters into separate units. Performing this analysis is useful because different font families may include different spacing between characters depending on the style of the font. The different spacing may affect the word segmentation analysis. Using the dynamically generated thresholds, the system can determine whether or not to merge two characters together into a unit. Calculating the thresholds improves the recognition of documents because the recognition is tailored to the font family for the document.

System

Figure 1:
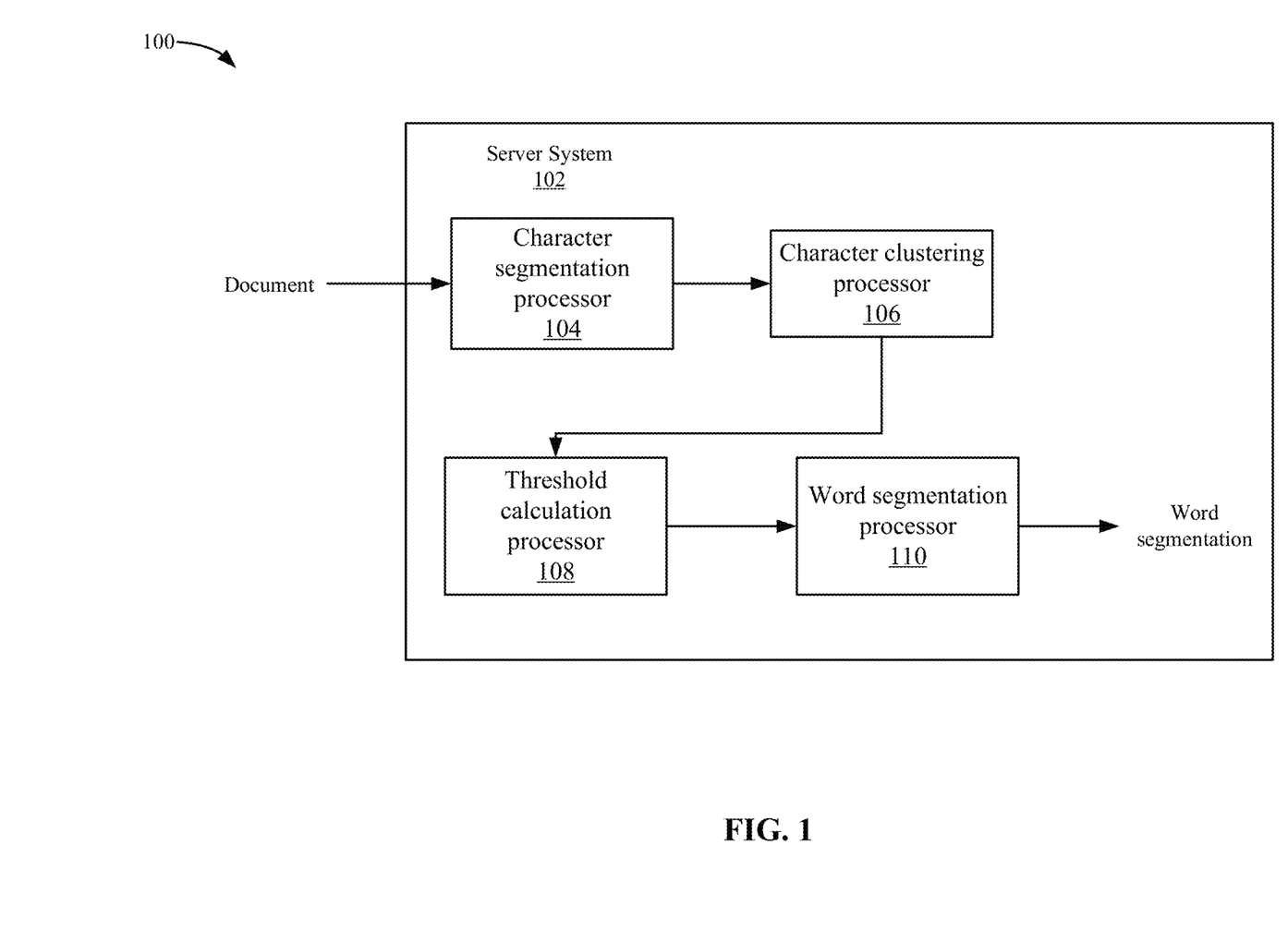
FIG. 1 depicts a server system for performing character recognition according to some embodiments.

FIG. 1 depicts a server system 102 for performing character recognition according to some embodiments. The character recognition may perform optical character recognition, but other methods of recognizing characters may be appreciated. A document may be any input that includes characters. The document may be text based (e.g., a word processing document) or images with text, but other sources of characters may be appreciated. Further, the segmentation will be described as segmenting the document into words, but other units may be used, such as columns.

Figure 2:
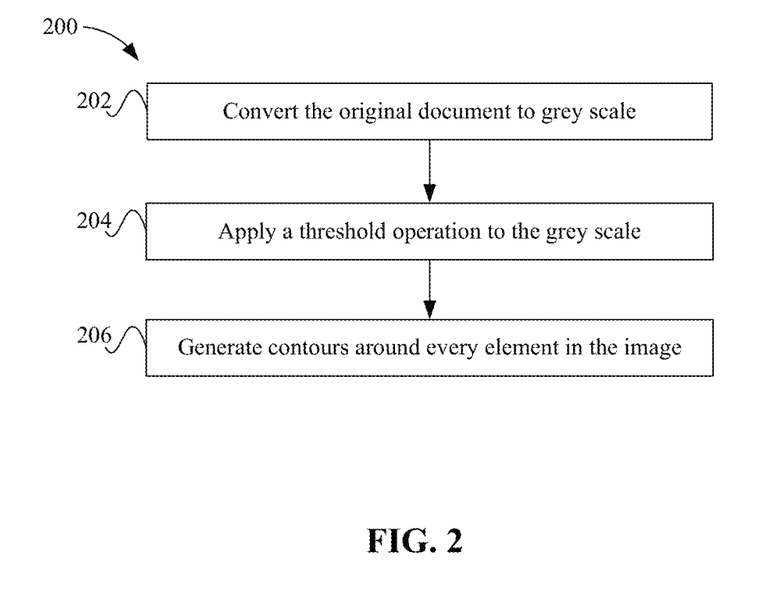
FIG. 2 depicts a simplified flowchart of a method for performing character segmentation according to some embodiments.

A character segmentation processor 104 receives a document, which may include text that includes characters that were generated in a font family. The font family may be a type of font, such as "Courier", "Arial", "Times New Roman", etc. Each font family may generate characters that have different properties. For example, the different font families may generate characters that are different sizes and the different font families may have different spacing between the characters due to the different character size or due to different properties of the font family Character Segmentation Character segmentation processor 104 then performs character segmentation of characters in the document. FIG. 2 depicts a simplified flowchart 200 of a method for performing character segmentation according to some embodiments. At 202, character segmentation processor 104 converts the original document to grey scale. Converting the original document to grey scale may allow computer vision recognition techniques to be performed on the document.

At 204, character segmentation processor 104 applies a threshold operation to the grey scale. The operation converts the grey scale image to a binary one (e.g., only black and white pixels) based on a defined threshold that divides pixels into black or white. The operations turns all the characters into black regions and everything around it into white, so that afterwards the contour operation draws a contour around all black elements in the image and by doing so generates the contours around each character.

Figure 3:
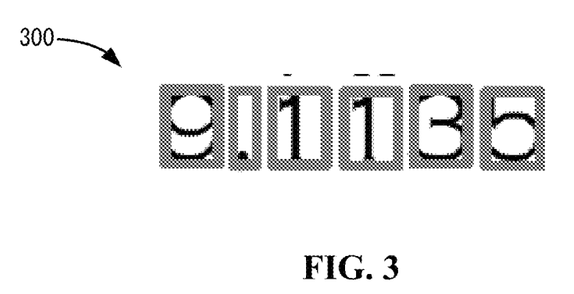
FIG. 3 depicts an example of the document after contours have been generated according to some embodiments.

At 206, character segmentation processor 104 then generates contours around every element in the image. Each contour represents a character in the image. FIG. 3 depicts an example of the document after contours have been generated according to some embodiments. As shown, each character includes a contour, such as a box, that surrounds each character. The contours provide a uniform outline around groups of characters that are similar sizes.

Referring back to FIG. 1, character segmentation processor 104 outputs the document with the contours. This document includes the contours around each character.

Character Clustering

A character clustering processor 106 then orders all the characters according to their positions into rows from top to bottom and within each row from left to right. Then, character clustering processor 106 may cluster every character into one of a number of groups based on a dimension, such as a width of the character. In some embodiments, the following groups may be used: a normal width character, a small character, and a punctuation character. Although these three character groups are described, other types of groups may be used especially when documents include different languages. The normal width character may be the character within which the majority of characters fall, such as the characters of "A", "B", "C", "2", "3", "4", etc. A small character may be characters that have a smaller width than the normal width characters, such as "1", "I", etc. A punctuation character includes punctuation characters, such as ",", ".", ";". Punctuation characters generally have a smaller width than the normal width characters and the small characters. The cluster that each character may fall within may be based on comparing the width of the character to one or more thresholds. For example, if the width of a character is above a first threshold, the character is a normal character, if the width of a character is below the first threshold but above a second threshold, the character is a small character, and if the width of a character is below the second threshold, then the character is a punctuation character.

Character clustering processor 106 may select three clusters as described above because some fonts may allocate the same size on the document for each character and therefore there is no fixed spacing. Instead, the spacing between the characters is determined by the allocated width per character minus the width of the character. This may result in uneven spacing between characters even within the same word. In this case, the smaller the character is, the bigger spacing to its neighbors might be even though the characters still both belong to the same word. Referring to FIG. 3, a string of characters depicts an example showing a font where there is no fixed spacing according to some embodiments. The word shown is "9,1135" and every digit has the same space but the character "1" is much smaller and therefore the distance between the character "1" and its neighbors is significantly bigger than the distance between the other larger characters. For example, the distance between the character "3" and the character "5" is smaller than the distance between the character "1" and the character "3". It is noted the spacing is between the actual text of the characters and not the contours around the characters. The contours may be used just to identify the individual characters.

In some embodiments, character clustering processor 106 performs the clustering based on the width that may be automatically detected using computer vision techniques and not based on any character recognition. That is, character clustering processor 106 does not know that a character is "3", but only knows the width of the character. Using the width of the characters is faster than having to recognize each character in the document and classifying each character into the clusters. In some embodiments, character clustering processor 106 appends the width of every character to a list and sorts the list. For example, the width of a character of "9" may be 13 pixels, and the width of the punctuation comma "," may be one pixel. The following shows the width of one row of characters where every entry represents the width of one character in the row: [13,14,54, 25,26,5,15,10,2,1,5,12,22,23,64,4,6,12,24]. It is noted that the numbers are not the actual numbers on the document, but the widths, such as a width in pixels.

Character clustering processor 106 may then sort the above list as: [1,2,4,5,5,6,10,12,12,13,14,15,22,23,24,25,26, 54,64]. In some embodiments, character clustering processor 106 may eliminate some outliers, such as the top and bottom 5%, but this may not be necessary. The list with the outliers eliminated is: [4,5,5,6,10,12,12,13,14,15,22,23,24, 25,26].

Then, character clustering processor 106 clusters the remaining sizes into three clusters described above, but may be a different number of clusters is characters are clustered into a different number of types: [4,5,5,6] [10,12,12,13,14, 15] [22,23,24,25,26]. Character clustering processor 106 may generate the clusters based on there being a distance between two characters that is above a threshold. For example, a difference of four pixels is found between the width of six and 10 and character clustering processor 106 determines that the cluster should be split in between these widths. Also, there is a difference of seven pixels between the width of 15 and 22 and character clustering processor 106 determines that a cluster boundary should be formed here between these widths based on a clustering algorithm that clusters similar widths together into a cluster.

Threshold Calculation

Figure 4:
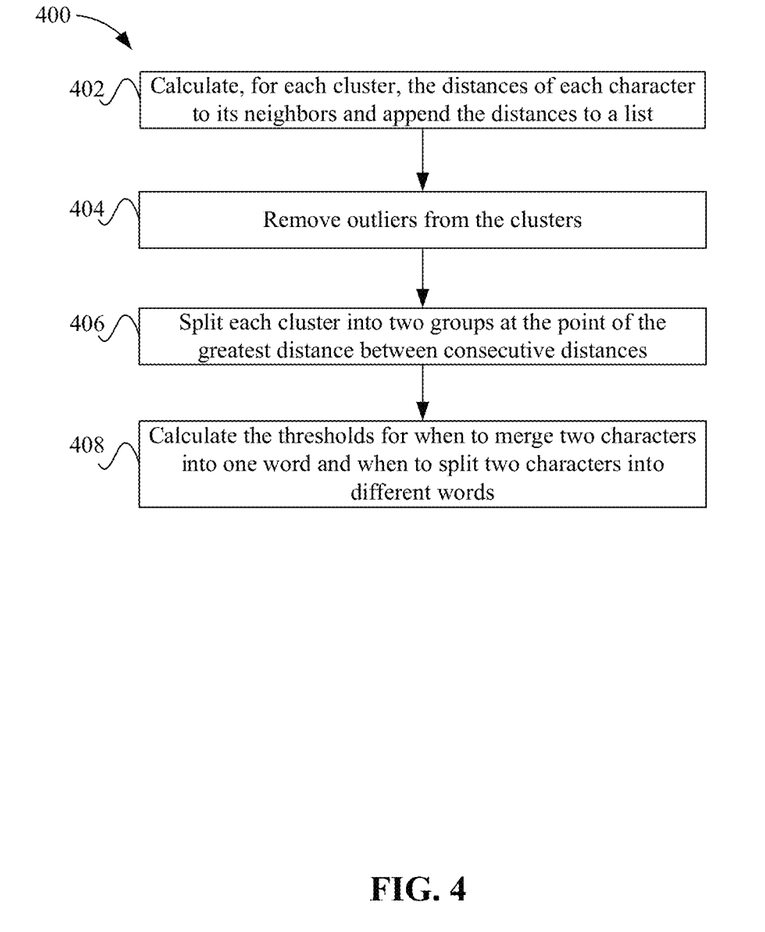
FIG. 4 depicts a simplified flowchart of a method for performing the threshold calculation according to some embodiments.

Character clustering processor 106 outputs the clusters and a threshold calculation processor 108 generates thresholds that can be used to determine whether a character is part of which cluster. FIG. 4 depicts a simplified flowchart 400 of a method for performing the threshold calculation according to some embodiments. At 402, threshold calculation processor 108 calculates, for each cluster, the distances of each character to its neighbors and appends the distances to a list. The distances may be measured using computer vision techniques that detect the end of a character and the beginning of the next character. Threshold calculation processor 108 measures the pixels from the end of one character to the start of the next character. The following shows the distance between characters per cluster with its neighbors:

$cluster_1$=[25,28,30,31,32,33,41,691]
$cluster_2$=[10,15,18,19,21,21,22,23,24,39,45,641]
$cluster_3$=[7,8,9,10,11,12,13,15,25,64]

In the above, the numbers shown are the distances between characters and not the actual number. For example, the distance "25" in $cluster_1$ is the width between two characters in $cluster_1$ and not the number "25". It is also noted that the widths provided may not correspond to the characters in the clusters described above in the character clustering section. These widths are just described as an example.

At 404, threshold calculation processor 108 removes outliers from the clusters. For example, threshold calculation processor 108 may remove the top and bottom 10% from the clusters. However, in other examples, the outliers may not be removed. The following shows the clusters with the outliers removed:

$cluster_1$=[28,30,31,32,33,41]
$cluster_2$=[15,18,19,21,21,22,23,24,39,45]
$cluster_3$=[8,9,10,11,12,13,15,25].

Then, at 406, threshold calculation processor 108 splits each cluster into two groups at the point of the greatest distance between consecutive distances. For example, threshold calculation processor 108 calculates the difference between every pair of consecutive numbers in a cluster and splits the cluster at a point where the difference is the greatest. The following show the cluster split into two groups at the point of the greatest distance between consecutive widths:

$cluster_1$=[28,30,31,32,33] [41]
$cluster_2$=[15,18,19,21,21,22,23,24][39,45]
$cluster_3$=[8,9,10,11,12,13,15][25].

In $cluster_1$, the difference is greatest between the distances of 33 and 41 compared to the differences between the rest of the distances. Similarly, in $cluster_2$, the difference between the distance of 24 and 39 is the greatest, and in $cluster_3$, the difference between the distance of 15 and 25 is the greatest in the cluster. Although the greatest distance is used to form the groups, other clustering algorithms may be used to form the groups.

The first group in each cluster represents the distance between characters that belong to one word while the second group represents the distance between characters between two words. That is, for cluster$_1$, the characters associated with the distances of "28, 30, 31, 32, and 33" form one word, and the characters associated with the distance of "41" form two words. For example, the distance between a character "B" and a character "Y" may be 41 pixels and these characters are from two different words. The letter B is the last letter of a first word and the letter Y is the first letter of a second word.

At 408, threshold calculation processor 108 then calculates the thresholds for when to merge two characters into one word and for when to split two characters into different words. For example, threshold calculation processor 108 calculates the mean per group in one cluster and adds the midpoint of the two mean values of the groups. The following shows the mean per group for each cluster:

| | |
|---|---|
| cluster$_1$: [28, 30, 31, 32, 33]→30.8 | [41]→41 |
| cluster$_2$: [15, 18, 19, 21, 21, 22, 23, 24]→ 21 | [39, 45]→42 |
| cluster$_3$: [8, 9, 10, 11, 12, 13, 15]→11 | [25]→25. |

In the above, for cluster$_1$, group 1, the mean is 30.8 and for cluster$_1$, group 2, the mean is 41; for cluster$_2$, group 1, the mean is 21 and for cluster$_2$, group 2, the mean is 42; and for cluster$_3$, group 1, the mean is 11 and for cluster$_3$, group 2, the mean is 25.

The following shows the calculation for the midpoint value:

$$\text{mid value cluster} = \frac{mean_{g2} - mean_{g1}}{2} + mean_{g1}$$

In the above, the midpoint takes the difference between the mean values for both groups, divides that value by 2, and then adds the mean value from group 1. For example, for cluster 1, the mid value is (41−30.8)/2+30.8=35.9. From this, threshold calculation processor 108 determines the thresholds. For example, the thresholds for the above groups may be:

threshold cluster$_1$: 35.9
threshold cluster$_2$: 31
threshold cluster$_3$: 18

Clusters is for the punctuation group (biggest spacing around characters), cluster$_2$ is for the narrow group (medium spacing), and cluster 3 for the normal group (smallest spacing). The above thresholds indicate the distance between characters where a word may be segmented. For example, if two characters are classified in a cluster$_1$, and there is a distance greater than 35.9 pixels between the two characters, then a word segmentation should be inserted at that point. If the characters are in multiple clusters, the bigger threshold of the two characters may be used. That is, if the two characters are in cluster 1 and cluster 2, then the bigger threshold 35.9 for cluster 1 is used. The bigger threshold is used because the smaller threshold may falsely segment the characters into two words.

Word segmentation processor 110 receives the thresholds and then uses the thresholds to determine when to and when not to merge two characters into a word. Word segmentation processor 110 may parse every character in every line and check the differences between each of the characters. For each of these checks, word segmentation processor 110 checks the width of both characters to determine the cluster in which the characters belong. Afterwards, word segmentation processor 110 applies the threshold that is derived based on the clusters of the two characters.

Figure 5:
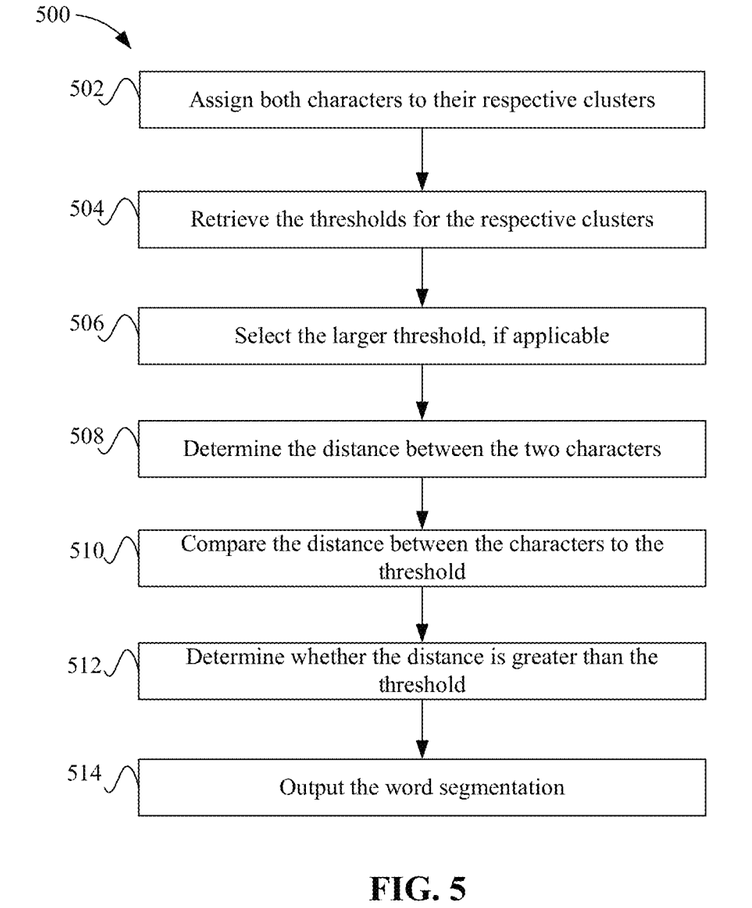
FIG. 5 depicts a simplified flowchart of a method for performing word segmentation according to some embodiments.
Figure 6:
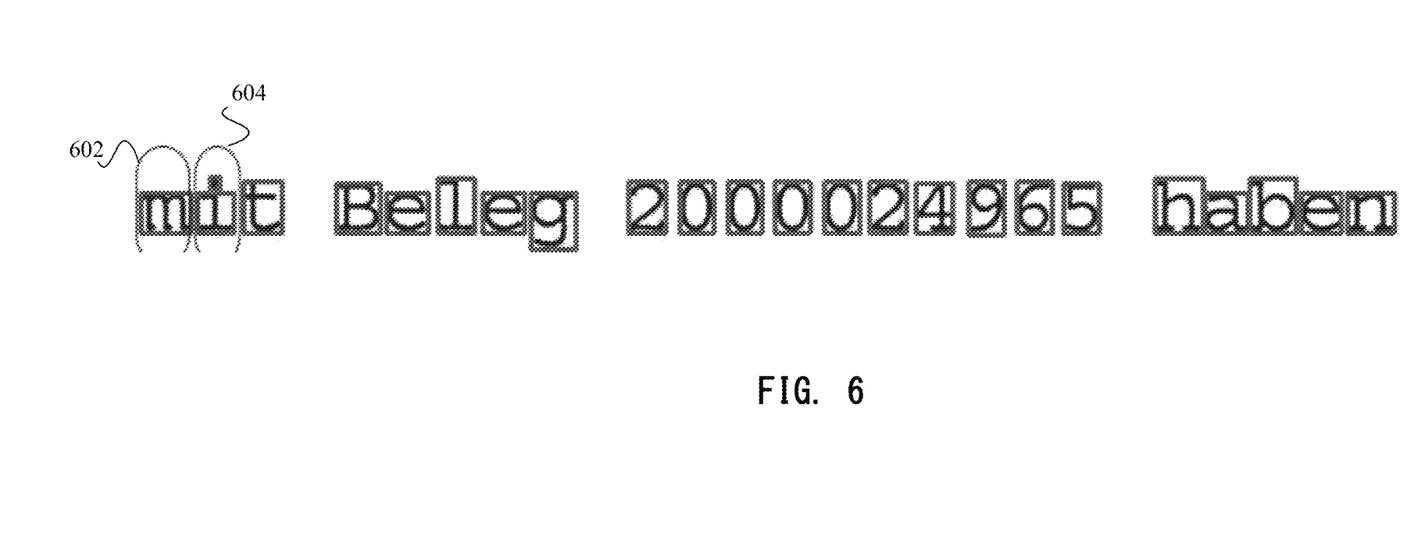
FIG. 6 shows an example of two characters being compared according to some embodiments.

The following describes the word segmentation in more detail. FIG. 5 depicts a simplified flowchart 500 of a method for performing word segmentation according to some embodiments. At 502, word segmentation processor 110 assigns both characters to their respective clusters. FIG. 6 shows an example of two characters being compared according to some embodiments. At 602, first character "m" belongs to cluster 3 because this character is a normal width character. Also, the character after it belongs to cluster 2 because this is a narrow width character "i". Word segmentation processor 110 determines the cluster based on the width of the character. Word segmentation processor 110 knows the dimensions of each character based on the initial contour operation. So word segmentation processor 110 knows character #1 has width X and character #2 has width Y, and based on these widths, characters are clustered into the groups as described in the character clustering section above.

Referring back to FIG. 5, at 504, word segmentation processor 110 retrieves the thresholds for the respective clusters. Then, at 506, word segmentation processor 110 selects the larger threshold, if applicable. For every comparison, the larger threshold of the two characters is used. That is, if the two characters are in cluster 2 and cluster 3, then the bigger threshold associated with cluster 1 and cluster 2 is used. In this case, the largest threshold is associated with cluster 1, which is 31 compared to 18 for cluster 3.

At 508, word segmentation processor 110 determines the distance between the two characters. For example, word segmentation processor 110 may measure the distance between the two characters. Or, the distance may have been measured between the two characters during the threshold calculation and word segmentation processor 110 may retrieve the distance.

At 510, word segmentation processor 110 compares the distance between the characters to the threshold. At 512, word segmentation processor 110 determines whether the distance is greater than the threshold. If the distance is greater than the threshold, word segmentation processor 110 does not merge the characters and generates separate words. If the distance is less than or equal to the threshold, word segmentation processor 110 merges the characters into one word.

Figure 7:
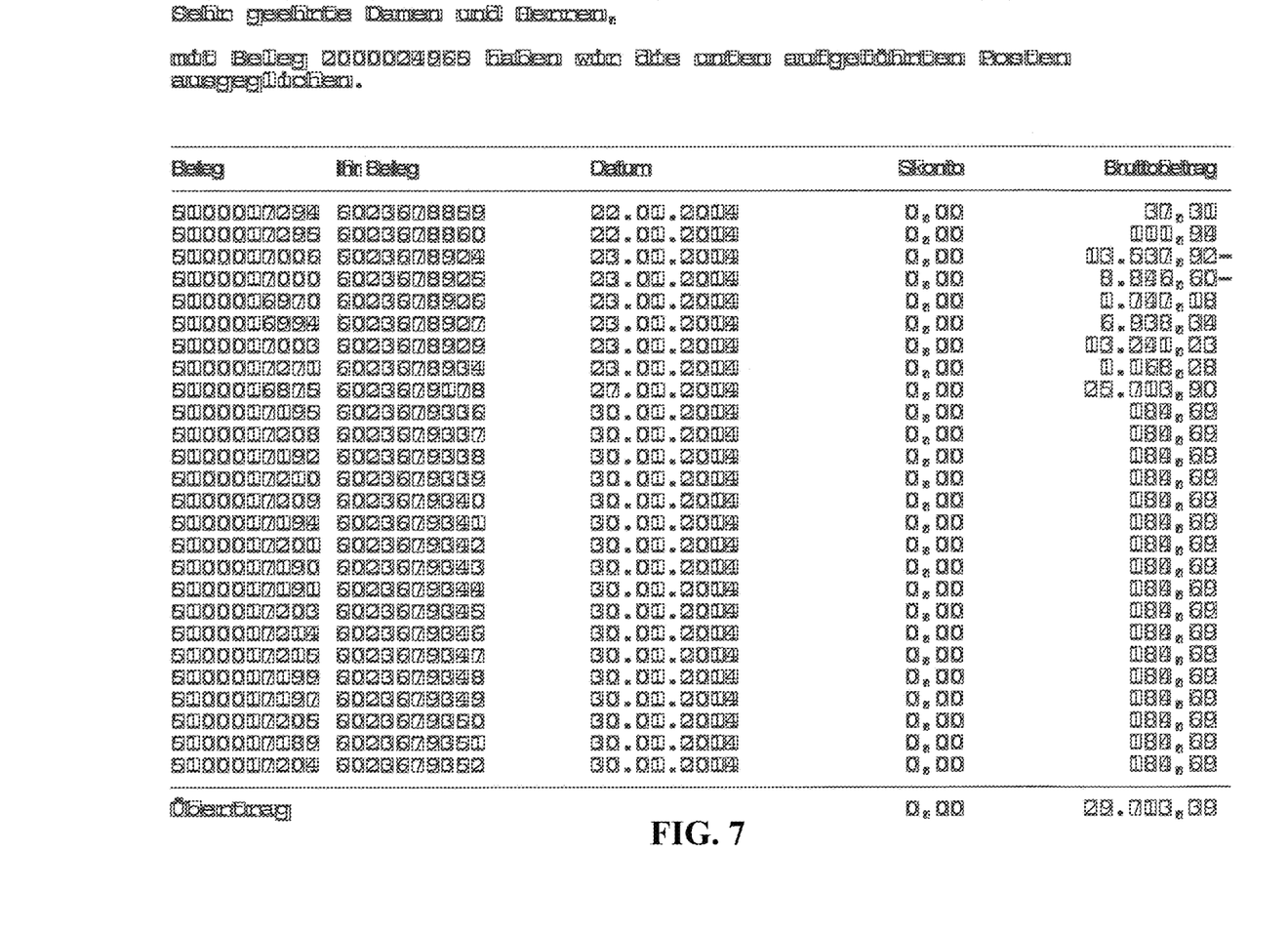
FIG. 7 shows an example of a document prior to segmentation according to some embodiments.
Figure 8:
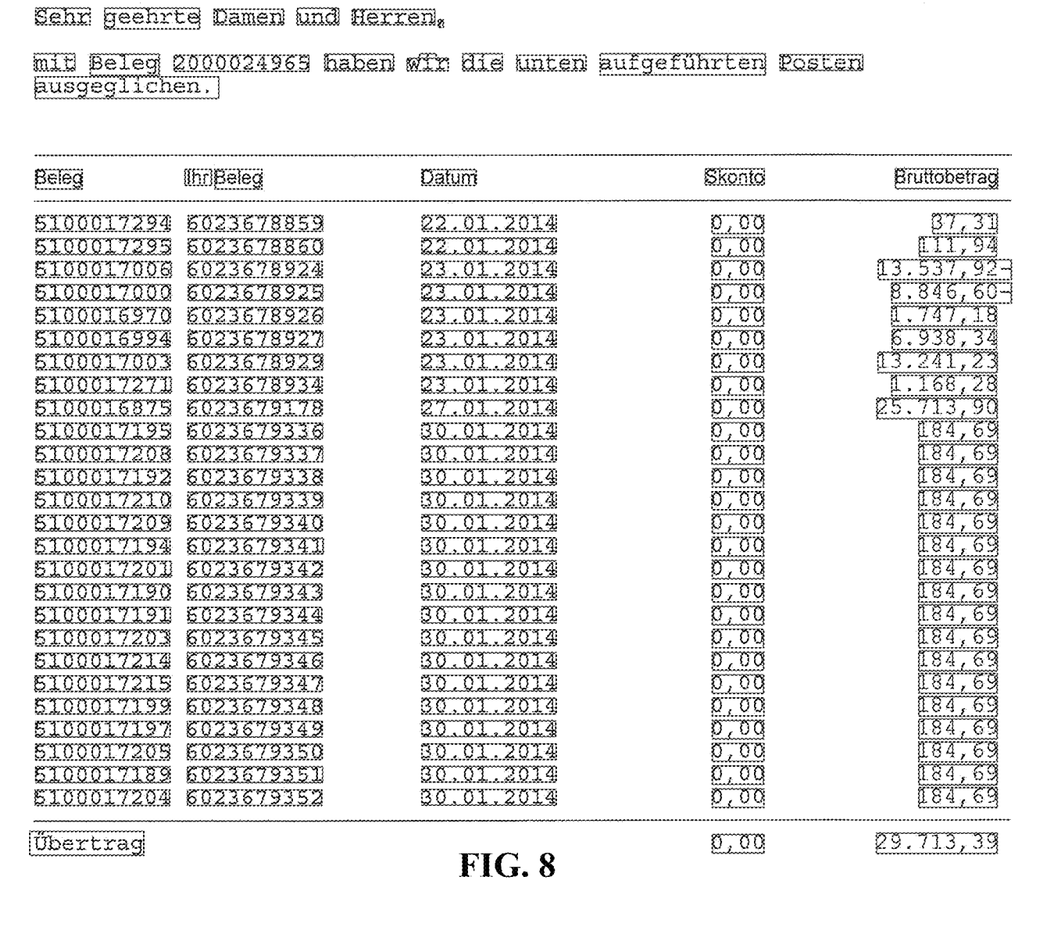
FIG. 8 shows an example of the word segmentation according to some embodiments.

At 514, word segmentation processor 110 outputs the word segmentation. FIG. 7 shows an example of a document prior to segmentation according to some embodiments. The document includes the contours around the characters to segment the characters. Then, FIG. 8 shows an example of the word segmentation according to some embodiments. As shown, word segmentation processor 110 has identified the words with a very good accuracy. For example, strings of numbers and the words have been correctly grouped together. The strings of numbers and words have been identified even though some words contain characters of different widths and different spacing between the characters.

Conclusion

Accordingly, some embodiments are able to recognize characters in words that are segmented more accurately. The process may recognize words based on the font family used in the documents. The font family is dynamically detected using the widths between characters. This is different from using a fixed process that does not consider the characteristics among font families are different. Also, it is noted that manually estimating the font family would not produce as accurate of results due to the number of characters that need to be analyzed to obtain accurate thresholds and also the widths and distances of the characters cannot be easily measured manually.

System

Figure 9:
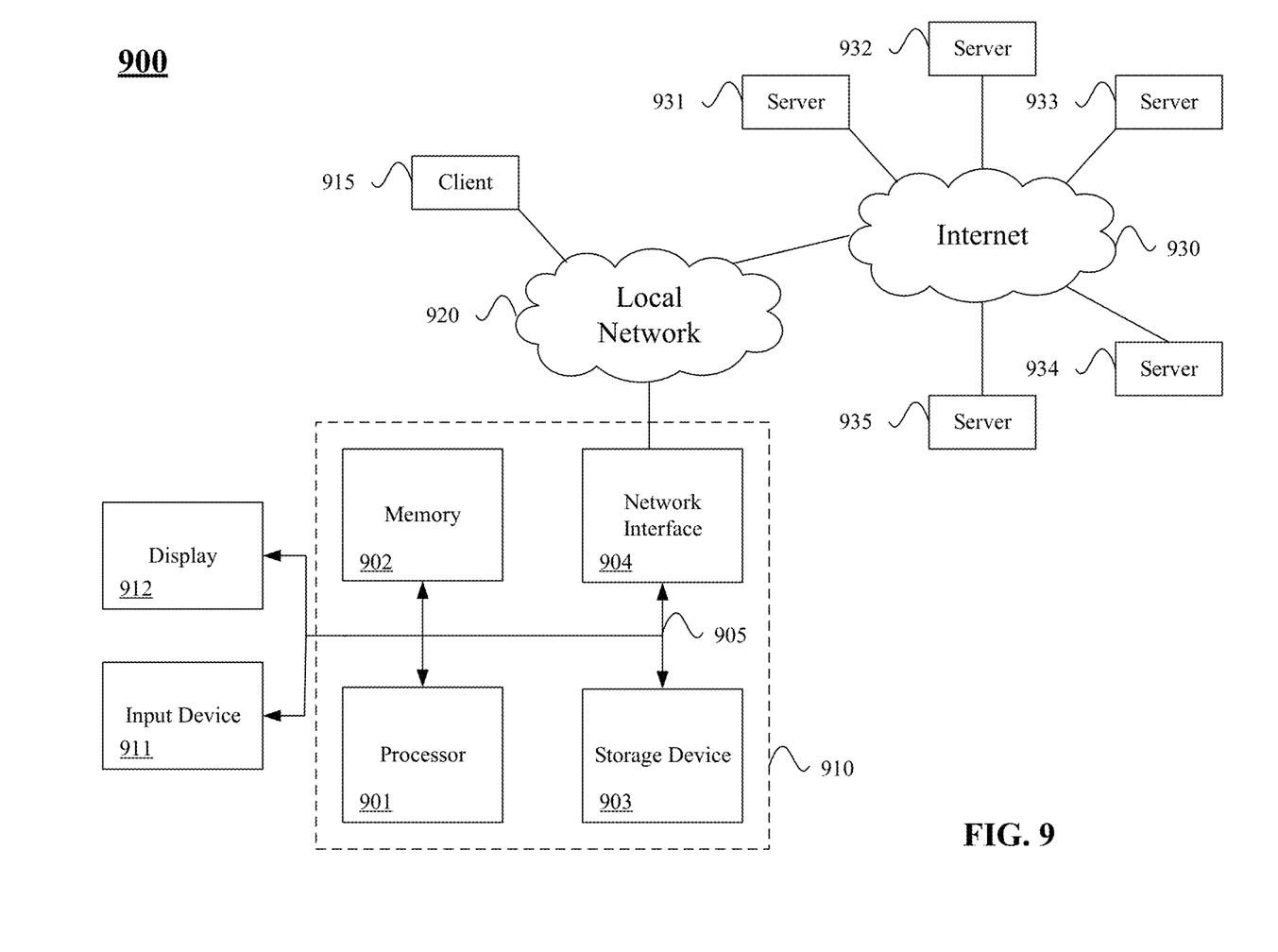
FIG. 9 illustrates hardware of a special purpose computing machine configured with the server system according to one embodiment.

FIG. 9 illustrates hardware of a special purpose computing machine configured with server system 102 according to one embodiment. An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable storage mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information through the network interface 904 across a local network 920, an Intranet, or the Internet 930. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   clustering, by a computing device, each character on a document into one of a plurality of clusters based on widths of at least a portion of the characters on the document;
   measuring, by the computing device, distances between characters on the document;
   calculating, by the computing device, a threshold for each of the plurality of clusters based on an average of distances between members of each clusters and neighbors of the members;
   segmenting, by the computing device, characters into units using the thresholds for the plurality of clusters, wherein a distance between two characters in the document is compared to a threshold for a cluster associated with a first character in the two characters and to a threshold for a cluster of a second character in the two characters, the two characters being classified as part of a unit when the distance is less than the thresholds and not being part of the unit when the distance is greater than the thresholds; and
   performing, by the computing device, a recognition process on the document using the units.

2. The method of claim 1, further comprising:
   generating a character segmentation of single characters on the document, wherein the widths are measured on the single characters and the distances measured between the single characters.

3. The method of claim 2, wherein generating the character segmentation comprises:
   inserting contours around each character to define the single characters.

4. The method of claim 1, wherein clustering each character into one of the plurality of clusters comprises:
   clustering each character in one of at least three clusters based on a dimension.

5. The method of claim 4, wherein the at least three clusters comprise a first cluster for characters with a width greater than a first threshold, a second cluster for characters with a width less than the first threshold and greater than a second threshold, and a third cluster for characters with a width less than the second threshold.

6. The method of claim 5, wherein the first cluster is for normal sized characters with the width greater than a first threshold, the second cluster is for narrow sized characters with the width less than the first threshold and greater than the second threshold, and the third cluster is for punctuation characters with the width less than the second threshold.

7. The method of claim 1, wherein clustering each character into one of the plurality of clusters comprises:
analyzing the widths of each character to classify each character into one of the plurality of clusters.

8. The method of claim 7, wherein analyzing the widths of each character to classify each character comprises:
sorting the width of each character in an order; and
determining at least one partition point between the plurality of clusters based on widths of characters.

9. The method of claim 8, further comprising:
forming three clusters based on a plurality of partition points.

10. The method of claim 7, wherein clustering each character into one of the plurality of clusters comprises:
eliminating some of the widths as outliers.

11. The method of claim 1, wherein calculating a threshold for each of the plurality of clusters based on at least a portion of the distances between characters in each cluster comprises:
calculating a distance between neighbors of characters in each of the plurality of clusters; and
splitting each of the plurality of clusters into two groups based on a point of greatest distance between neighbors in each of the plurality of clusters.

12. The method of claim 11, further comprising:
calculating the threshold for the two groups in each of the plurality of clusters based on the distances found in each respective group.

13. The method of claim 11, wherein the threshold for each of the plurality of clusters is based on a mean of distances in the two groups of the cluster and a midpoint of the means of the distances of the two groups.

14. The method of claim 11, further comprising:
eliminating some of the distances as outliers.

15. The method of claim 1, wherein segmenting characters into units using the thresholds comprises:
determining clusters in which two characters are associated; and
selecting the threshold as a largest threshold associated with the clusters.

16. The method of claim 15, wherein segmenting characters into units using the thresholds:
comparing a distance between two characters to the threshold;
when the distance is greater than the threshold, classifying the two characters in different units; and
when the distance is less than the threshold, classifying the characters in the same unit.

17. The method of claim 1, wherein:
the plurality of clusters comprise at least three clusters,
each cluster includes a threshold, and
the threshold is selected between two characters based on a largest threshold associated with clusters for the two characters.

18. A non-transitory computer-readable storage medium containing instructions, that when executed, control a computer system to be configured for:
clustering each character on a document into one of a plurality of clusters based on widths of at least a portion of the characters on the document;
measuring distances between characters on the document;
calculating a threshold for each of the plurality of clusters based on an average of distances between members of each clusters and neighbors of the members;
segmenting characters into units using the thresholds for the plurality of clusters, wherein a distance between two characters in the document is compared to a threshold for a cluster associated with a first character in the two characters and to a threshold for a cluster of a second character in the two characters, the two characters being classified as part of a unit when the distance is less than the thresholds and not being part of the unit when the distance is greater than the thresholds; and
performing, by the computing device, a recognition process on the document using the units.

19. The non-transitory computer-readable storage medium of claim 18, wherein calculating a threshold for each of the plurality of clusters based on at least a portion of the distances between characters in each cluster comprises:
calculating a distance between neighbors of characters in each of the plurality of clusters; and
splitting each of the plurality of clusters into two groups based on a point of greatest distance between neighbors in each of the plurality of clusters.

20. An apparatus comprising:
one or more computer processors; and
a non-transitory computer-readable storage medium comprising instructions, that when executed, control the one or more computer processors to be configured for:
clustering each character on a document into one of a plurality of clusters based on widths of at least a portion of the characters on the document;
measuring distances between characters on the document;
calculating a threshold for each of the plurality of clusters based on an average of distances between members of each clusters and neighbors of the members;
segmenting characters into units using the thresholds for the plurality of clusters, wherein a distance between two characters in the document is compared to a threshold for a cluster associated with a first character in the two characters and to a threshold for a cluster of a second character in the two characters, the two characters being classified as part of a unit when the distance is less than the thresholds and not being part of the unit when the distance is greater than the thresholds; and
performing, by the computing device, a recognition process on the document using the units.

* * * * *